United States Patent Office 3,142,621
Patented July 28, 1964

3,142,621
ALGINATE SUSPENSIONS OF ORAL PHARMACEUTICAL COMPOSITIONS WITH IMPROVED TASTE QUALITIES
Jack Lazarus, Jersey City, and Jack Cooper, Summit, N.J., assignors to Ciba Corporation, a corporation of Delaware
No Drawing. Filed Nov. 2, 1961, Ser. No. 149,497
15 Claims. (Cl. 167—82)

This invention relates to and has for its object the provision of a series of pharmaceutical compositions having improved taste qualities. When pharmaceutical compositions contain active ingredients of bad taste (or when the bad taste emanates from some other cause in these compositions), it is desirable to mask the taste in order to make the compositions more palatable and sometimes even to prevent an emetic effect. Thus, it is known that coatings are applied to such compositions in tablet form, by procedures which involve extensive additional treatment to obtain the desired qualities and activity. Where liquid forms, such as suspensions, are to be used, one may attempt to eliminate taste which is undesirable by adding flavoring materials, such as chocolate syrup, strawberry syrup, etc. In certain cases such flavoring is inadequate. It has now been found that medicinal compositions of this type, in suspension form for oral use, may be taste-masked adequately by incorporating in the compositions which do or do not contain the added flavoring material, a minor amount of an alginate selected from the group consisting of alkali group alginates, such as sodium alginate, potassium alginate, ammonium alginate—or other equivalent alginates, such as lower alkylene glycol alginates (e.g. propylene glycol alginate). The alginate which is used is a purified grade, essentially free of trace metals (especially calcium). It is used in a proportion of about 0.1% to about 5% of the composition, preferably about 0.1% to about 2.0%. Where substances, such as Veegum HV, 225–375 centipoises viscosity in 4% aqueous solution at 25° C. (hydrated magnesium aluminum silicate) are added, additional alginate may be added to aid in giving the final suspension its thixotropic properties. The alginates vary, of course, in viscosity and those alginates having a viscosity at about 25° C., in 1% aqueous solution, of about 10 to about 1500 centipoises may be used. Preferred are those alginates having a viscosity, under the conditions given above, of about 800–1100 centipoises. Regular grades of alginates are generally available in viscosities ranging from about 10 to about 1000 centipoises when measured in a concentration of 1% in purified water. The calcium ion content has a range of about 0.8% to 1.2%. The regular grade of sodium alginate is prepared by precipitating the algin, extracted from certain species of kelp, with a calcium salt and then converting the calcium alginate into the sodium alginate. Other alkali group alginates are prepared in similar manner; one may also obviously prepare alginic acid for use per se, or for esterification to propylene glycol alginate, etc.

The purified grades used in this invention are available in a range of from about 10 to about 1500 centipoises and the trace metals as calcium ion concentration has a maximum limit of 0.2%. The purified grade is prepared by precepitating the align extract with acid and then neutralizing with alkali. This procedure produces an alginate with a lower calcium content than the regular grade, measured at a maximum of about 0.2% maximum trace metals as calcium. If desired, one may add calcium, aluminum or equivalent salts, such as calcium chloride, calcium citrate, aluminum chloride, etc., which react with a portion of the purified sodium alginate, to form a water-resistant product, provided the calcium or aluminum ion is not added in quantities large enough to precipitate alginate. The suspended drug particles which are surrounded by the colloidal solution of sodium alginate are thus encased by the formation of the water-resistant reaction product.

As medicinals utilizable in oral suspension form, and compounded in accordance with the present invention, one may have 3-phenyl (or pyridyl)-3-lower alkyl-2,6-dioxo-piperidines of the formula:

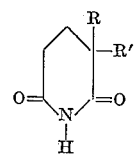

wherein R is lower alkyl (preferably methyl or ethyl) and R' is phenyl, para-primary amino-substituted phenyl or pyridyl. Particularly preferred for use in the compositions of the invention are α-ethyl-α-phenyl-glutarimide and also α-ethyl-α-(p-aminophenyl)-glutarimide. The compounds described above are included in U.S. Patents No. 2,673,205 and No. 2,848,455, and these disclosures, with respect to the compounds taught therein, are specifically incorporated by reference in this case. It is to be noted, however, that any other medicinal compositions used, for example, in the form of oral suspension, are subject to the procedures of the present invention for obtaining compositions of improved taste. Thus, among the medicinal compositions which may be alginate-treated to yield compositions of improved taste are those (oral suspensions, preferably) containing as an active ingredient in addition to those named above, sulfa drugs, such as N'-sulfanilylacetamide, N'-2-pyrimidiny l-sulfanilamide, N'-(4-methyl-2-pyrimidyl)-sulfanilamide, or combinations of them or (N-1-phenyl-5-pyrazolyl)-sulfanilamide, etc. One may alginate-treat combinations of known sulfa drugs with antibiotics, such as penicillins, tetra cyclines, etc. Of course, the antibiotics themselves may be alginate-treated to obtain improved formulations. In addition, tranquilizing drugs, such as 2-methyl-2-propyl-1,3-propanediol dicarbamate or other products disclosed in U.S. Patent No. 2,724,720 or any other such products having tranquilizing effect, and of unpalatable taste quality. Thus, one may include the subject matter of U.S. Patent Nos. 2,937,119 and 2,893,992 and other such subject matter.

The oral suspensions of the invention may be made up to include the usual auxiliary substances, such as preserving agents, stabilizing agents, wetting or emulsifying agents, etc., in addition to the liquid pharmaceutical carrier. They may also contain, in combination, other therapeutically useful substances.

One may include in the compositions of the invention, the usual coloring and flavoring materials. For example, certified coal tar dyes may be added to color the suspension, and fruit and natural flavors (or synthetic flavors), as well as sweetening agents may also be added. Certified food colors include, for example, those described in Martin et al. "Remington's Practice of Pharmacy," 11th edition, Mack Publishing Company, Easton, Pennsylvania, 1956, pages 1161–2. Sweetening agents include such materials as sucrose, sodium saccharine, sodium cyclamate, etc. Examples of flavors which may be used are (1) fruit flavors, such as cherry, raspberry, currant, loganberry, banana, pineapple, etc., (2) citrus flavors, such as orange, lemon, lime, etc. and (3) miscellaneous flavors, such as anise, licorice, coffee, chocolate, cinnamon, etc.

Where α-ethyl-α-phenyl-glutarimide or α-ethyl-α-(p-aminophenyl)-glutarimide or equivalent medicinal compounds are used in the suspensions of the invention, it is preferable to utilize the medicinal compound in hydrated form. This may be done as follows, using α-ethyl-α-phenyl-glutarimide, as the medicinal compound (other equivalent compounds are prepared in the identical manner.

| | | |
|---|---|---|
| α-Ethyl-α-phenyl-glutarimide | gm__ | 25 |
| 95% ethanol | ml__ | 200 |
| 0.1% Aerosol OT, aqueous solution | ml__ | 800 |
| Purified water | | q.s. |

The crystals of α-ethyl-α-phenyl-glutarimide are dissolved in the ethanol, and the Aerosol OT aqueous solution slowly added thereto; the mixture is centrifuged and the precipitate retained. The precipitate is then washed with the purified water until all ethanol has been removed. The moist crystals so obtained are then used for preparing the suspension of the invention.

This material may also be prepared according to the following formula and procedure:

| | | |
|---|---|---|
| α-Ethyl-α-phenyl-glutarimide | kg__ | 250.000 |
| Aerosol OT | kg__ | 1.250 |
| Methyl paraben | kg__ | 1.875 |
| Methyl paraben | kg__ | 2.550 |
| Purified water | lt__ | 1250.000 |
| α-Ethyl-α-phenyl-glutarimide hydrate (seed crystals) | kg (anhydrous)__ | 0.750 |

*Procedure.*—Heat to 80° C., 1240 liters of water in a stainless steel kettle fitted with a three blade impeller, add 1.875 kg. of methyl paraben and stir until dissolved. Cool to 48° C.±2° C. and then maintain this temperature throughout the process. Add the α-ethyl-α-phenyl-glutarimide crystals and mix at 75 r.p.m. Dissolve the Aerosol OT in 10 liters of purified water and add to the batch. Then add the α-ethyl-α-phenyl-glutarimide hydrate seed crystals and continue stirring for at least 48 hours or until the conversion of the α-ethyl-α-phenyl-glutarimide to the α-ethyl-α-phenyl-glutarimide hydrate is complete.

Feed the batch by gravity to the 30 inch portable centrifuge with the centrifuge running at low speed (600 r.p.m.). Wash the cake with purified water, flowing at a rate of 6 liters per minute for 30 minutes. Then wash the α-ethyl-α-phenyl-glutarimide hydrate with the methyl paraben solution flowing at 6 liters per minute. The methyl paraben solution is prepared by dissolving 2.55 kg. methyl paraben in 1700 liters of purified water, using heat to facilitate solution, then cool. Do not spin the batch dry at any time.

Package the wet cake into polyethylene lined fiber drums. Repeat the centrifuging process until all of the material has been removed from the kettle.

The amount of therapeutically active compound used in the suspensions of the invention is identical with that normally used where the compositions contain no added alginate. Thus, the amount of therapeutically active drug may be expected to be present in a range of about 0.5% to about 15%. Where α-ethyl-α-phenyl-glutarimide or α-ethyl-α-(p-aminophenyl-glutarimide (or other compounds of these series) is used as the therapeutically active compound, it is normally present in an amount of about 2.5% to about 5%. Similarly, (N-1-phenyl-5-pyrazolyl)-sulfanilamide may be preferably compounded to contain about 10% of this ingredient in the oral suspension.

In the following illustrative examples and throughout the specification, parts are always by weight in grams unless otherwise specified. It is also to be understood that where α-ethyl-α-phenyl-glutarimide or α-ethyl-α-(p-aminophenyl)-glutarimide or the equivalent compounds described in U.S. Patent Nos. 2,673,205 and 2,848,455 are used in the working examples or otherwise in the invention, they may be used either in the standard matter described in the patents or as the hydrate, prepared as described above, whether so indicated or not.

This application is in part a continuation of our application Serial No. 71,176, filed November 23, 1960, now abandoned.

*Example 1*

| | | |
|---|---|---|
| α-Ethyl-α-phenyl glutarimide slurry equivalent to | gm__ | 25.0 |
| Sodium alginate (100 cps.) | gm__ | 20.0 |
| Methyl paraben | gm__ | 1.0 |
| Calcium citrate | gm__ | 1.0 |
| Flavor | | q.s. |
| Purified water q.s. | ml__ | 1000.0 |

*Procedure.*—Dissolve the methyl paraben in 500 ml. of purified water heated to 80° C. Cool to 50° and dissolve the sodium alginate in the methyl paraben solution. Cool to 25° C. Add the α-ethyl-α-phenyl-glutarimide slurry, mix well. Make a slurry of the calcium citrate in 150 ml. of water and slowly add to the mixture. Add the flavor and enough purified water to make 100 ml. Mix well.

*Example 2*

| | | |
|---|---|---|
| α-Ethyl-α-phenyl glutarimide slurry equivalent to | gm__ | 25.0 |
| Sodium alginate (100 cps.) | gm__ | 5.0 |
| Methylcellulose (100 cps.) | gm__ | 20.0 |
| Calcium citrate | gm__ | 1.0 |
| Methyl paraben | gm__ | 1.0 |
| Flavor | | q.s. |
| Purified water q.s. | ml__ | 1000.0 |

*Procedure.*—Dissolve the methyl paraben in 500 ml. of purified water heated to 80° C. Cool to 50° and dissolve the sodium alginate in the methyl paraben solution. Cool to 25° C. Add the methylcellulose and mix well, then add the α-ethyl-α-phenyl-glutarimide slurry, mix well. Make a slurry of the calcium citrate in 150 ml. of water and slowly add to the mixture. Add the flavor and enough purified water to make 100 ml. Mix well.

*Example 3*

| | | |
|---|---|---|
| α-Ethyl-α-phenyl-glutarimide Slurry equivalent to | gm__ | 25.0 |
| Sodium alginate (500 cps.) | gm__ | 20.0 |
| Methyl paraben | gm__ | 1.0 |
| Calcium chloride | gm__ | 1.0 |
| Flavor | | q.s. |
| Purified water q.s. | ml__ | 1000.0 |

*Procedure.*—Dissolve the methyl paraben in 500 ml. of purified water heated to 80° C. Cool to 50° and dissolve the sodium alginate with aqueous stirring. Add the α-ethyl-α-phenyl-gluutarimide slurry with mixing. Dissolve the calcium chloride in 100 ml. of purified water and add to the mixture with stirring. Add the flavor and enough purified water to make 1000 ml. Mix well.

*Example 4*

| | | |
|---|---|---|
| α-Eethyl-phenyl-glutarimide Slurry equivalent to | gm__ | 25.0 |
| Sodium alginate (1000 cps.) | gm__ | 10.0 |
| Sodium carboxymethylcellulose, low velocity | gm__ | 20.0 |
| Calcium citrate | gm__ | 1.0 |
| Methyl paraben | gm__ | 1.0 |
| Flavor | | q.s. |
| Purified water q.s. | ml__ | 1000.0 |

*Procedure.*—Dissolve the methyl paraben in 500 ml. of purified water heated to 80° C. Cool to 50° C. and disperse the sodium alginate and the sodium carboxymethylcellulose with adequate mixing. Add the α-ethyl-α-phenyl-glutarimide slurry with mixing. Slurry the 1 gm. of calcium citrate in 100 ml. of purified water and add to the mixture with stirring. Add the flavor and sufficient purified water to make 1000 ml.

Example 5

| | | |
|---|---|---|
| α-Ethyl-α-phenyl-glutarimide | gm | 25.0 |
| Slurry equivalent to | | |
| Sodium alginate (100 cps.) | gm | 20.0 |
| Aluminum chloride | gm | 1.0 |
| Methyl paraben | gm | 1.0 |
| Flavor | | q.s. |
| Purified water q.s. | ml | 1000.0 |

*Procedure.*—Dissolve the methyl paraben in 500 ml. of purified water heated to 80° C. Cool to 50° C. and dissolve the sodium alginate with stirring. Add the slurry of α-ethyl-α-phenyl-glutarimide, then a solution of the aluminum chloride in 50 ml. of purified water. Mix well. Add the flavor and enough purified water to make 1000 ml.

Example 6

| | | 1100 lt. |
|---|---|---|
| N-(1-phenyl-5-pyrazolyl)-sulfanilamide | kg | 110.00 |
| Sodium alginate special grade | kg | 3.86 |
| Veegum HV | kg | 9.35 |
| Glycerin | kg | 110.00 |
| Methyl paraben | kg | 1.98 |
| Propyl paraben | kg | 0.22 |
| Sucrose | kg | 440.00 |
| Sodium saccharin | kg | 0.55 |
| Color | | q.s. |
| Flavor | | q.s. |
| Purified water q.s. | lt | 1100.00 |

*Procedure.*—Heat 660 liters of purified water to 80° C. and dissolve the parabens. Add the Veegum and mix until uniformly dispersed. Then add the sodium alginate and when dissolved add the sucrose. Add the sodium saccharin dissolved in 2.0 liters of purified water. When the sucrose has dissolved, cool to 40° C. and add the glycerin. Gradually add the N-(1-phenyl-5-pyrazolyl)-sulfanilamide. Stir until homogeneous, avoiding the entrapment of air. Cool to room temperature and add the flavors. Add the colors. Add enough purified water to make the products measure 1100 lt. Fill into bottles.

As has been indicated above, one may substitute other medicinals or other standard oral suspension forms for those given in the recited examples and obtain the desired effects of the invention by adding the purified alginate in the manner indicated in the disclosure and working examples.

This invention may be variously otherwise embodied within the scope of the appended claims.

What is claimed is:

1. A pharmaceutical composition of improved taste qualities, in oral suspension form, comprising (1) a compound of the formula:

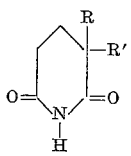

wherein R is lower alkyl and R' is a member selected from the group consisting of phenyl and pyridyl, (2) a purified alkali group alginate in an amount of about 0.1 to about 5% and (3) a liquid pharmaceutical carrier.

2. A pharmaceutical composition of improved taste qualities, in oral suspension form, comprising (1) a compound of the formula:

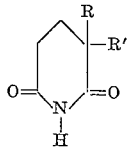

wherein R is lower alkyl and R' is a member selected from the group consisting of phenyl and pyridyl, (2) purified propylene glycol alginate in an amount of about 0.1 to about 5% and (3) a liquid pharmaceutical carrier.

3. A pharmaceutical composition of improved taste qualities, in oral suspension form, comprising (1) a compound of the formula:

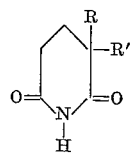

wherein R is lower alkyl and R' is a member selected from the group consisting of phenyl and pyridyl, (2) purified potassium alginate in an amount of about 0.1 to about 5% and (3) a liquid pharmaceutical carrier.

4. A pharmaceutical composition of claim 1, wherein R' is phenyl.

5. A pharmaceutical composition of claim 4, wherein the alkali group alginate is present in an amount of about 0.1 to about 2.0%.

6. A pharmaceutical composition of improved taste qualities, in oral suspension form, comprising (1) α-ethyl-α-phenyl-glutarimide, (2) purified alkali group alginate in an amount of about 0.1 to about 5% and (3) a liquid pharmaceutical carrier.

7. A pharmaceutical composition of improved taste qualities, in oral suspension form, comprising (1) α-ethyl-α-phenyl-glutarimide, (2) a purified alkali group alginate in an amount of about 0.1 to about 2.0% and (3) a liquid pharmaceutical carrier.

8. A pharmaceutical composition of claim 6, wherein the alkali group alginate is sodium alginate.

9. A pharmaceutical composition of claim 7, wherein the akali group alginate is sodium alginate.

10. A pharmaceutical composition of improved taste qualities, in oral suspension form, comprising (1) α-ethyl-α-(p-aminophenyl)-glutarimide, (2) purified alkali group alginate in an amount of about 0.1 to about 5% and (3) a liquid pharmaceutical carrier.

11. A pharmaceutical composition of improved taste qualities, in oral suspension form, comprising (1) α-ethyl-α-(p-aminophenyl)-glutarimide, (2) a purified alkali group alginate in an amount of about 0.1 to about 2.0% and (3) a liquid pharmaceutical carrier.

12. A pharmaceutical composition of claim 10, wherein the alkali group alginate is sodium alginate.

13. A pharmaceutical composition of claim 11, wherein the alkali group alginate is sodium alginate.

14. A method for providing a pharmaceutical composition of improved taste qualities in oral suspension form, which comprises adding to said pharmaceutical composition having as its essential active ingredient a compound of the formula

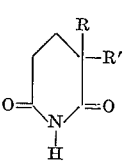

wherein R is lower alkyl and R' is a member selected from the group consisting of phenyl and pyridyl, a purified alkali group alginate in an amount of about 0.1 to about 5%.

15. A method for providing a pharmaceutical composition of improved taste qualities in oral suspension form, which comprises adding to said pharmaceutical composition having as its essential active ingredient a compound of the formula

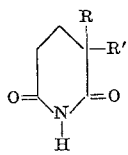

wherein R is lower alkyl and R' is a member selected from the group consisting of phenyl and pyridyl, a purified lower alkylene glycol alginate in an amount of about 0.1 to about 5%.

References Cited in the file of this patent

UNITED STATES PATENTS

| | | |
|---|---|---|
| 2,673,205 | Hoffmann et al. | Mar. 23, 1954 |
| 2,724,720 | Berger et al. | Nov. 22, 1955 |
| 2,848,455 | Hoffmann et al. | Aug. 19, 1958 |
| 2,893,992 | Sternbach | July 7, 1959 |
| 2,937,119 | Berger et al. | May 17, 1960 |
| 2,992,925 | Green et al. | July 18, 1961 |

OTHER REFERENCES

Whistler et al.: "Industrial Gums, Polysaccharides, and Their Derivatives," Academic Press, N.Y., © August 4, 1959, entry "Algin," pp. 55–56, 61–72, 74–82.